(12) United States Patent
He et al.

(10) Patent No.: US 12,347,877 B2
(45) Date of Patent: Jul. 1, 2025

(54) CASING FOR BATTERY AND BATTERY

(71) Applicants: Shenzhen Hairun New Energy Technology Co., Ltd., Shenzhen (CN); Xiamen Hithium Energy Storage Technology Co., Ltd., Xiamen (CN)

(72) Inventors: Bo He, Xiamen (CN); Weidong Xu, Xiamen (CN); Nan Zhang, Xiamen (CN); Ziqi Yi, Xiamen (CN); Zuyu Wu, Xiamen (CN)

(73) Assignee: HITHIUM TECH HK LIMITED, Hong Kong (CN)

( * ) Notice: Subject to any disclaimer, the term of this patent is extended or adjusted under 35 U.S.C. 154(b) by 420 days.

(21) Appl. No.: 17/902,998

(22) Filed: Sep. 5, 2022

(65) Prior Publication Data

US 2023/0079390 A1 Mar. 16, 2023

(30) Foreign Application Priority Data

Sep. 10, 2021 (CN) .......................... 202122186504.5

(51) Int. Cl.
*H01M 50/133* (2021.01)
*H01M 50/107* (2021.01)
*H01M 50/152* (2021.01)

(52) U.S. Cl.
CPC ....... *H01M 50/133* (2021.01); *H01M 50/107* (2021.01); *H01M 50/152* (2021.01)

(58) Field of Classification Search
CPC . H01M 50/133; H01M 50/107; H01M 50/152
See application file for complete search history.

(56) References Cited

U.S. PATENT DOCUMENTS

2011/0165455 A1* 7/2011 Murakami .......... H01M 50/154
429/169

FOREIGN PATENT DOCUMENTS

KR 20090082125 A 7/2009
WO 2013094207 A1 6/2013

OTHER PUBLICATIONS

CN202549997 translation (Year: 2012).*
EP22194629.6 Extended European Search Report, Jan. 23, 2023.

* cited by examiner

*Primary Examiner* — Jane J Rhee
(74) *Attorney, Agent, or Firm* — IPro, PLLC

(57) ABSTRACT

The present invention discloses a casing for a battery and the battery. The casing for the battery comprises a body. The body comprises a shell and at least one cover; at least one end of the shell is open; the cover is arranged at the one end of the shell; the shell comprises at least one first shell portion and a second shell portion which are connected to each other; the first shell portion is opposite to the cover; a thickness of the first shell portion is larger than that of the second shell portion; and a groove recessed toward a central axis direction of the shell is formed in the first shell portion.

7 Claims, 3 Drawing Sheets

CASING FOR BATTERY AND BATTERY

CROSS REFERENCE TO RELATED APPLICATION

The present disclosure claims the benefit of priority to Chinese patent application No. 202122186504.5, filed on Sep. 10, 2021 to China National Intellectual Property Administration and titled "Casing for Battery and Battery", which is incorporated herein by reference in its entirety.

TECHNICAL FIELD

The present invention relates to the technical field of batteries, in particular to a casing for a battery and a battery.

BACKGROUND

In the prior art, if a thickness of a shell for a battery is not reasonably set, a space for accommodating a winding core in the shell cannot be guaranteed; waste of materials for manufacturing the shell is easily caused; a space of the shell is reduced, the energy density of the winding core inside is lowered; and a weight of the battery is too large, which results in increase a weight and a volume of equipment using the battery, too high cost and lowering in market competitiveness.

SUMMARY

The present invention aims to at least solve one of the technical problems in the prior art. For this reason, an objective of the present invention is to propose a casing for a battery and a battery.

The casing for the battery according to an embodiment in the first aspect of the present invention comprises a body. The body comprises a shell and at least one cover; at least one end of the shell is open; the cover is arranged at the one end of the shell; the shell comprises at least one first shell portion and a second shell portion which are connected to each other; the first shell portion is opposite to the cover; a thickness of the first shell portion is larger than that of the second shell portion; and a groove recessed toward a central axis direction of the shell is formed in the first shell portion.

Thus, the thickness of the first shell portion is larger than that of the second shell portion, which may guarantee a connection strength between the first shell portion and the cover; and meanwhile, the thickness of the second shell portion is thinner, which may facilitate widening in the space in the shell, increases the energy density of the winding core and lowers the weight and the material cost. The groove recessed inward is formed in the first shell portion and may improve the supporting performance and the sealing performance of the first shell portion to the cover, improve the connection strength of an adaptive structure between the shell and the cover and facilitate mounting of the cover.

In some embodiments, a transition portion is connected between the first shell portion and the second shell portion and has a thickness gradually increasing in a direction from the second shell portion toward the first shell portion.

In some embodiments, a minimal distance between the groove and the transition portion is $D_1$, wherein $D_1$ satisfies: $0 \leq D_1 \leq 30$ mm.

In some embodiments, an included angle between two surfaces of the transition portion in a thickness direction is $\beta$, wherein $\beta$ satisfies: $0° < \beta < 90°$.

In some embodiments, an inner surface of the first shell portion is flush with that of the second shell portion.

In some embodiments, the cover comprises a body and a side wall; and the body closes the one end of the shell; the side wall is connected to an outer periphery of the cover body; the side wall penetrates the one end of the shell, and extends into the shell; and the side wall is opposite to the first shell portion.

In some embodiments, an end of the side wall away from the cover body, is located on one side, away from a center of the shell, of the groove.

In some embodiments, an end of the side wall away from the cover body, is opposite to the groove in a radial direction of the shell.

In some embodiments, two ends of the shell are open; two covers are arranged at the two ends of the shell respectively; two first shell portions are connected to two axial ends of the second shell portion respectively; the two first shell portions are opposite to the two covers respectively; and the groove is formed in at least one of the first shell portions.

The battery according to an embodiment in second aspect of the present invention comprises the casing for the battery according to any one of the embodiments.

The additional aspects and the advantages of the present invention will be partially set forth in the following description, and in part will be apparent from the following description, or may be learned by practice of the present invention.

BRIEF DESCRIPTION OF FIGURES

The mentioned-above and/or additional aspects and advantages of the present invention will be apparent and easily understood in descriptions of the embodiments in combination with the following drawings, wherein.

Figure 1:
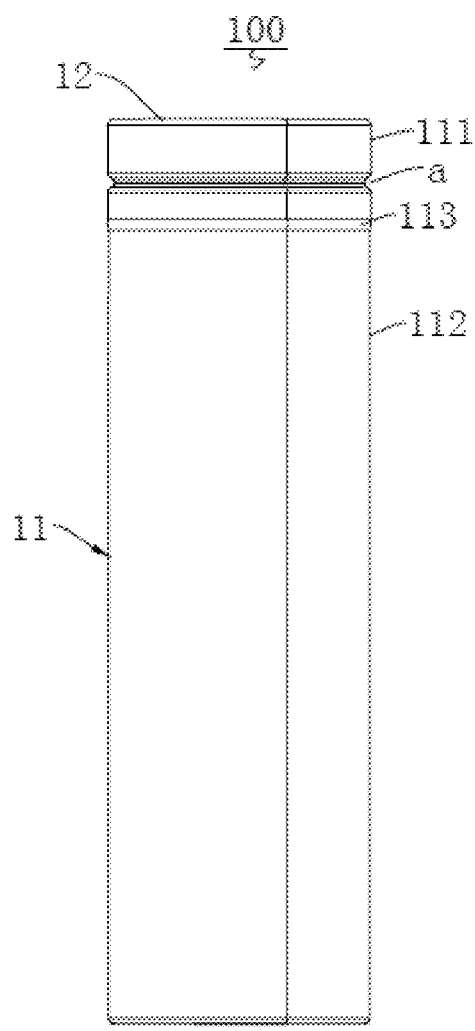
FIG. 1 is a schematic diagram of a body according to an embodiment of the present invention.

REFERENCE NUMERALS body 100;
shell 11; first shell portion 111; groove a; second shell portion 112; transition portion 113;
cover 12.

DETAILED DESCRIPTION

The embodiments of the present invention are described in detail below; the embodiments described with reference to the drawings are illustrative; and the casing for the battery and the battery according to the embodiments of the present invention are described with reference to FIGS. 1-3 below.

The casing for the battery according to an embodiment in the first aspect of the present invention comprises a body 100. The body 100 comprises a shell 11 and at least one cover 12; at least one end of the shell 11 is open; the cover 12 is arranged at the one end of the shell 11; the shell 11 comprises at least one first shell portion 111 and a second shell portion 112 which are connected to each other; the first shell portion 111 is opposite to the cover 12; a thickness of the first shell portion 111 is larger than that of the second shell portion 112; and a groove a recessed toward a central axis direction of the shell 11 is formed in the first shell portion 111. For example, the groove a may be formed by using rolling processing, so as to guarantee a connection strength between the shell 11 and the cover 12.

Figure 2:
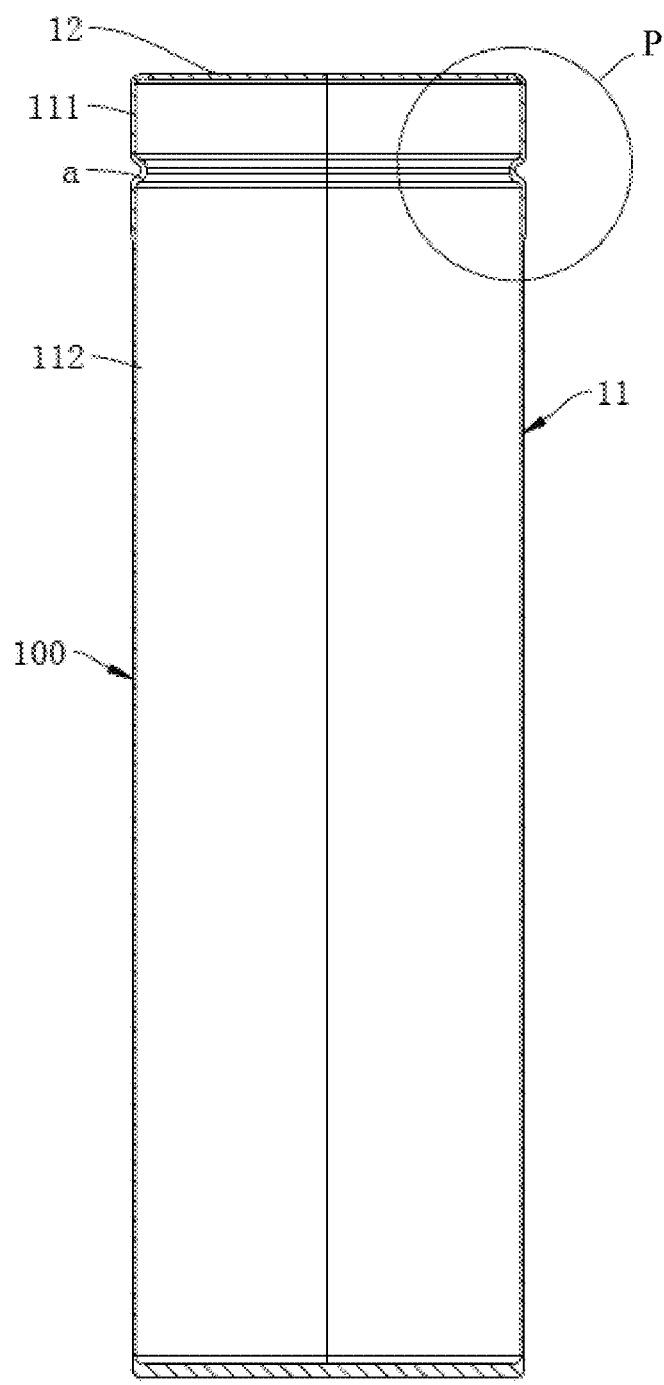
FIG. 2 is a sectional schematic diagram of a shell according to an embodiment of the present invention.
Figure 3:
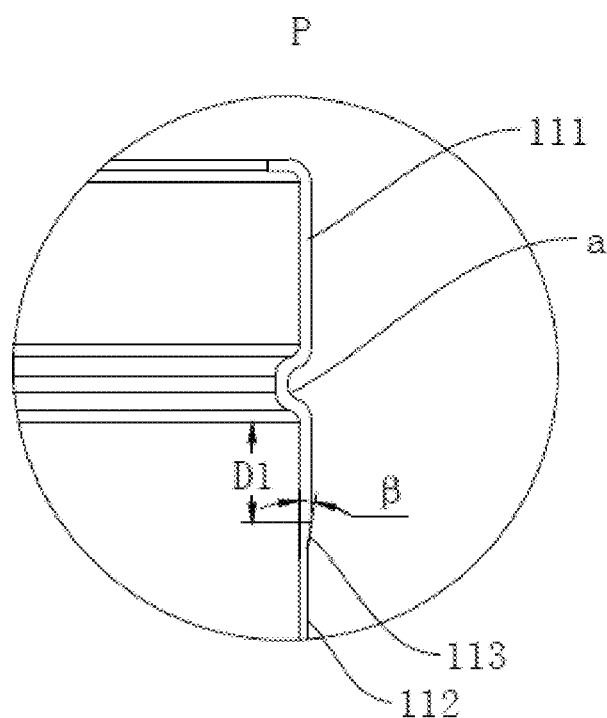
FIG. 3 is an enlarged view of a P region in FIG. 2.

As shown in FIGS. 1-3, the first shell portion 111 and the second shell portion 112 are distributed in an axial direction of the body 100 in sequence; at least one end of the two ends of each of the first shell portion 111 and the second shell portion 112 is open, wherein one end, away from the second shell portion 112, of the first shell portion 111 adapts to the cover 12; the groove a recessed toward the interior of the shell 11 in a radial direction is formed in an outer surface of the first shell portion 111 and may be a groove a annularly arranged; and a wall thickness, in the radial direction of the shell 11, of the first shell portion 111 is larger than that of the second shell portion 112. A winding core (not shown) may be opposite to the second shell portion 112.

Thus, the thickness of the first shell portion 111 is larger than that of the second shell portion 112, which may guarantee the connection strength between the first shell portion 111 and the cover 12; and meanwhile, the thickness of the second shell portion 112 is thinner, which may facilitate widening in the space in the shell 11, increases the energy density of the winding core and lowers the weight and the material cost. The groove a recessed inward is formed in the cover 12 and the first shell portion 111 and may improve the supporting performance and the sealing performance of the first shell portion 111 to the cover 12, improves the connection strength of an adaptive structure between the shell 11 and the cover 12 and facilitates mounting of the cover 12.

Further, a transition portion 113 is connected between the first shell portion 111 and the second shell portion 112 and has a thickness gradually increasing in a direction from the second shell portion 112 toward the first shell portion 111.

As shown in FIGS. 1-3, the transition portion 113 is arranged at a connection part between the first shell portion 111 and the second shell portion 112 and is gradually inclined away from a side wall of the first shell portion 111 in a direction from one side, on which the second shell portion 112 is located, toward one side, on which the first shell portion 111 is located; that is, a thickness of one side, close to the cover 12, of the transition portion 113 in the radial direction of the first shell portion 111 is larger than that of one side, close to the second shell portion 112, of the transition portion 113 in the radial direction of the first shell portion 111.

Thus, a transition section for connecting the first shell portion 111 to the second shell portion 112 is inclined, so that transition between the first shell portion 111 and the second shell portion 112 is smooth; occurrence of corner angles is reduced; and smoothness of an external of the shell 11 is improved. Meanwhile, one end, close to the cover 12, of the transition section has a larger thickness, which facilitates improvement in supporting of the cover 12 and structure strength of the shell 11 of the battery.

Optionally, as shown in FIG. 3, a minimal distance between the groove a and the transition portion 113 is $D_1$, wherein $D_1$ satisfies: $0 \leq D_1 \leq 30$ mm. That is, in the radial direction of the shell 11, a distance between one side, facing the transition portion 113, of the groove a and one side, facing the groove a, of the transition portion 113 is $D_1$. When $D_1=0$, the groove a is connected with the transition portion 113.

Thus, by controlling the minimal distance between the groove a and the transition portion 113, the groove a improves the structure strength of the battery while forming supporting to the cover 12 and improving the stability of the cover 12. The distance between the groove a and the transition portion 113 may be specifically set according to the actual needs, so as to conveniently improve the applicability of the body.

Specifically, as shown in FIGS. 2-3, an included angle between two surfaces, in a thickness direction, of the transition portion 113 is $\beta$, wherein $\beta$ satisfies: $0°<\beta<90°$. For example, one surface, in the thickness direction, of the transition portion 113 coincides with an outer surface of the shell 11; and the included angle $\beta$ is formed between the other surface, in the thickness direction, of the transition portion 113 and the one surface, in the thickness direction, of the transition portion 113. For example, the thickness direction is the radial direction of the shell 11.

The other surface, in the thickness direction, of the transition portion 113 may be a straight line. When the other surface, in the thickness direction, of the transition portion 113 is an arc, the included angle $\beta$ may refer to an included angle between a tangent line at a point, most distant from the one surface, in the thickness direction, of the transition portion 113 and the one surface, in the thickness direction, of the transition portion 113.

Thus, the included angle between the two surfaces, in the thickness direction, of the transition portion 113 is defined; a risk that the first shell portion 111 is broken down or the phenomenon of an insufficient penetration during welding connection between the cover 12 and the shell 11 is prevented while the thickness of the first shell portion 111 is increased; the connection strength between the shell 11 and the cover 12 is affected; and the service life and the structure strength of the battery may be improved.

In some embodiments, an inner surface of the first shell portion 111 is flush with that of the second shell portion 112. That is, a diameter of an inner wall of the first shell portion 111 is identical to that of an inner wall of the second shell portion 112; and an extension of a central axis of the first shell portion 111 coincides with that of a central axis of the second shell portion 112.

Thus, the inner surface of the first shell portion 111 is flush with that of the second shell portion 112, which may increase a space in the shell 11, weakens the effect on the winding core mounted inside and facilitates mounting of the winding core and a miniaturization design of the battery.

Specifically, the cover 12 may comprise a cover 12 body and a side wall; the cover 12 body closes one end of the shell 11; the side wall is connected to the outer periphery of the cover 12 body; the side wall penetrates the one end of the shell 11, and extends into the shell 11; and the side wall is opposite to the first shell portion 111.

As shown in FIGS. 1-2, the cover 12 adapts to the shell 11 at one end, away from the second shell portion 112, of the first shell portion 111; the side wall of the cover 12 is matched with the inner wall of the first shell portion 111; one end, close to the center of the shell 11, of the cover 12 may abut against and retain one side, close to the center of the shell 11, of the groove a. Thus, the side wall of the cover 12 is connected to the outer periphery of the cover 12 body, the outer periphery is tightly connected with the interior of the first shell portion 111, and sealing may be achieved.

In some embodiments, an end of the side wall away from the cover body, is located at one side, away from a center of the shell 11, of the groove a. For example, the free end of the side wall is one end on one side, close to the center of the shell 11, of the cover 12; the side, away from the center of the shell 11, of the groove a refers to that the groove a makes a contact to the cover 12 at a side surface, close to the center of the shell 11, of the cover 12 to form supporting and limiting to the cover 12.

Thus, the free end of the side wall is located on one side, away from the center of the shell 11, which adds supporting and limiting to the cover 12 by the shell 11, improves the sealing performance of the cover 12 to the shell 11, prevents the cover 12 from excessively recessing into the shell 11 and may guarantee an accommodating space for the winding core in the shell 11.

Optionally, an end of the side wall away from the cover body, is opposite to the groove a in the radial direction of the shell 11. The side wall is extruded by the groove a recessed toward the interior of the shell 11 in the radial direction of the shell 11, the groove a forms a corresponding protrusion on an inner side of the shell 11 to form extrusion to the side wall; and the side wall may be recessed toward the interior of the shell 11 along the protrusion in the radial direction.

Thus, the free end of the side wall is opposite to the groove a in the radial direction of the shell 11; the extruded groove a may abut against and retain the side wall and forms extrusion to the side wall; and then the sealing performance and the connection strength of the connection part between the shell 11 and the cover 12 are improved, so that the battery has better performance and longer service life.

In some embodiments, the two ends of the shell 11 are open; two covers 12 are arranged at the two ends of the shell 11 respectively; two first shell portions 111 are connected to two axial ends of the second shell portion 112 respectively and are opposite to the two covers 12 respectively; and the groove a is formed in at least one first shell portion 111. Certainly, in another some embodiments, one cover 12 may also be provided.

It is understood that the shell 11 may be distinguished into two first shell portions 111 and one second shell portion 112 in an axial direction, wherein the two first shell portions 111 are connected with the second shell portion 112 at two ends of the second shell portion 112 respectively; at least one first shell portion 111 is subjected to treatment with rolling process, and an annular rolled groove (groove a) is formed in the first shell portion 111; the groove a forms the protrusion inward in the radial direction of the shell 11; and the protrusion may abut against and retain the side wall of the cover 12 and may further make a contact to the cover 12 at the one end, close to the center of the shell 11, of the cover 12. The covers 12 for adapting to the first shell portions 111 at the two ends may be different in structure; the cover 12 at one end covers the free end of one first shell portion 111 at the end part of the first shell portion 111, and the other end of the first shell portion 111 is connected with the transition portion 113; and the cover 12 seals one end, close to the first shell portion 111, of the shell 11. The covers 12 adapting to the two first shell portions 111 are matched with each other at one end through the groove a formed in the shell 11 opposite to the covers 12 and form fixed connection at the other end through welding; that is, outer peripheries, being in contact to the covers 12, of the side walls of the first shell portions 111 are welded to form sealing of the shell 11 and connection between the shell 11 and the covers 12.

Thus, the first shell portions 111 are connected to the two ends of the second shell portion 112 respectively; and an annular groove a is formed in at least one first shell portion 111 through the rolling process in a circumferential direction, which facilitates addition of sealing to the shell 11 and improvement in structure strength of the connecting part between the shell 11 and the cover 12.

The battery according to an embodiment in second aspect of the present invention comprises the casing for the battery according to any one of the embodiments.

As shown in FIGS. 1-3, a groove a is formed in the first shell portion 111 of the shell 11, may be formed through the rolling process, extends in the circumferential direction of the first shell portion 111, is inclined inward on one side, away from the center of the shell, of the side wall of the shell 11 and forms a protrusion on one side, close to the center of the shell 11, of the shell 11; and the protrusion may abut against and retain the end part on one side, close to the center of the shell 11, of the cover 12 and may further abut against and retain the side wall of the cover 12 and form a certain extrusion force to the side wall.

The battery may be a single-channel battery or a double-channel battery. For example, when the battery has one channel, the body 10 only comprises one cover 12; the cover 12 is arranged at one end of the shell 11, adapts to an opening of the shell 11 and is provided with an electrode pole (not shown in drawings); and the groove a is formed in the first shell portion 111 and may extrude the side wall of the cover 12 or abut against and retain the end part on one side, close to the center of the shell 11, of the cover 12 to form extrusion and supporting to the cover 12. An electrode pole may not be arranged at the other end of the shell 11; a top wall or a bottom wall of the shell (when the cover 12 is configured with the top wall, the other end of the shell 11 is configured with the bottom wall; and when the cover 12 is configured with the bottom wall, the other end of the shell 11 is configured with the top wall) and the side wall may be an integrally formed piece; or the top wall or the bottom wall of the shell may be connected with the side wall through welding. For the battery with such arrangement, the stability of structure of the battery shell 11 may be improved; so that the battery can have good structure strength, may better protect the winding core in the shell 11 and improve the ability of the shell 11 of wholly resisting deformation.

When the battery has double channels, the electrode poles may be arranged at the two ends of the shell 11 respectively; one first shell portion 111 is connected to each of the two ends of the second shell portion 112; and a groove a can be formed in at least one first shell portion 111 in the circumferential direction to form supporting and/or extrusion to the cover 12 matched with the at least one first shell portion 111. When the groove a is formed in one first shell portion 111 and one end of the second shell portion 112 through the rolling process, the other first shell portion 111 may adapt to the other end of the second shell portion 112 without arranging the groove a; and connection between the other first shell portion 111 and the second shell portion 112 is achieved through welding. Certainly, the shell 11 may be formed with grooves a in the two first shell portions 111 adapting to the two ends of the second shell portion 112 at the same time; on one hand, the cover 12 adapting to the first shell portions 111 may be supported, the procedure of fixing the cover 12 is reduced, and mounting of the cover 12 and the shell 11 is facilitated; and on the other hand, sealing to the shell 11 may be formed, and the sealing performance of the battery is improved.

Thus, by forming the groove a in the shell 11 of the battery, supporting and limiting to the cover 12 by the shell 11 are facilitated, and an improvement in the sealing performance to the interior of the shell 11 is added; as the thickness of the first shell portion 111 in the radial direction of the shell 11 is larger than that of the second shell portion 112, the structure strength of the shell 11 may be improved, and then the stability is higher after the shell 11 adapts to the cover 12; and with corresponding reduction in thickness of the second shell portion 112, the space in the shell 11 is increased, and the energy density of the winding core in the battery is increased while the use amount of a material for manufacturing the shell 11 is reduced.

In description of the present invention, it should be understood that orientations or positional relationships indicated by terms "center", "length", "width", "thickness", "upper", "lower", "front", "rear", "left", "right", "vertical", "horizontal", "top", "bottom", "inner", "outer", "axial", "radial", "circumferential" and the like are based on orientations or positional relationships shown in the drawings, are to facilitate the description of the present invention and simplify the description merely, do not indicate or imply that the referred apparatuses or elements must have specific orientations and are constructed and operated in the specific orientations and thus should not be construed to limit the present invention.

In description of the present invention, "first feature" and "second feature" may comprise one or more of the features. In the description of the present invention, "a plurality" means two or more. In the description of the present invention, the first feature "over" or "under" the second feature may comprise a direct contact between the first feature and the second feature, and may also comprise a contact between the first feature and the second feature by interposing an additional feature rather than the direction contact between the first feature and the second feature. In the description of the present invention, the first feature "over", "above" or "under" the second feature comprises that the first feature is right over or obliquely over the second feature, or merely represents that a horizontal height of the first feature is larger than that of the second feature.

In descriptions of this specification, descriptions in the reference terms "an embodiment", "some embodiments", "exemplary embodiment", "example", "specific example", "some examples" or the like mean that the specific features, structures, materials or characteristics described in combination with the embodiments or the examples are included in at least one embodiment or example of the present invention. In the present specification, the schematic representation of the above terms does not necessarily mean the same embodiment or example.

While the embodiments of the present invention have been illustrated and described, it can be understood to those of ordinary skill in the art that various changes, modifications, substitutions and alterations can be made herein without departing from the principle and the objective of the present invention, and the scope of the present invention is defined by the appended claims and equivalents thereof.

What is claimed is:

1. A casing for a battery, comprising:
   a body, wherein the body comprises a shell and at least one cover; at least one end of the shell is open; the cover is arranged at the one end of the shell; the shell comprises at least one first shell portion and a second shell portion which are connected to each other; the first shell portion is opposite to the cover; a thickness of the first shell portion is larger than a thickness of the second shell portion; and a groove recessed toward a central axis direction of the shell is formed in the first shell portion;
   wherein a transition portion is connected between the first shell portion and the second shell portion and has a thickness gradually increasing in a direction from the second shell portion toward the first shell portion;
   wherein an included angle between two surfaces of the transition portion in a thickness direction is $\beta$, wherein $\beta$ satisfies: $0° < \beta < 90°$;
   wherein an inner surface of the first shell portion is flush with an inner surface of the second shell portion.

2. The casing for the battery according to claim 1, wherein a minimal distance between the groove and the transition portion is $D_1$, wherein $D_1$ satisfies: $0 \leq D_1 \leq 30$ mm.

3. The casing for the battery according to claim 1, wherein the cover comprises:
   a cover body, wherein the cover body closes the one end of the shell;
   a side wall, wherein the side wall is connected to an outer periphery of the cover body; the side wall penetrates the one end of the shell, and extends into the shell; and the side wall is opposite to the first shell portion.

4. The casing for the battery according to claim 3, wherein an end of the side wall away from the cover body, is located on one side, away from a center of the shell, of the groove.

5. The casing for the battery according to claim 3, wherein an end of the side wall away from the cover body, is opposite to the groove in a radial direction of the shell.

6. The casing for the battery according to claim 1, wherein two ends of the shell are open;
   two covers are arranged at the two ends of the shell respectively;
   two first shell portions are connected to two axial ends of the second shell portion respectively;
   the two first shell portions are opposite to the two covers respectively; and the groove is formed in at least one of the first shell portions.

7. A battery, comprising the casing for the battery according to claim 1.

\* \* \* \* \*